(12) United States Patent
Millstein et al.

(10) Patent No.: US 9,161,102 B2
(45) Date of Patent: Oct. 13, 2015

(54) METER DEVICE WITH SUPPORTING COMMUNICATIONS

(75) Inventors: Donald P. Millstein, Moorestown, NJ (US); Kantol Khek, Moorestown, NJ (US)

(73) Assignee: Honeywell International Inc., Morristown, NJ (US)

(*) Notice: Subject to any disclaimer, the term of this patent is extended or adjusted under 35 U.S.C. 154(b) by 1298 days.

(21) Appl. No.: 13/013,471

(22) Filed: Jan. 25, 2011

(65) Prior Publication Data

US 2011/0181438 A1    Jul. 28, 2011

Related U.S. Application Data

(60) Provisional application No. 61/297,993, filed on Jan. 25, 2010.

(51) Int. Cl.
| | |
|---|---|
| G08C 15/06 | (2006.01) |
| G08C 19/06 | (2006.01) |
| H02B 1/00 | (2006.01) |
| G01R 21/00 | (2006.01) |
| G01R 31/00 | (2006.01) |
| G01R 31/34 | (2006.01) |
| H04Q 9/00 | (2006.01) |

(52) U.S. Cl.
CPC ............ *H04Q 9/00* (2013.01); *H04Q 2209/30* (2013.01); *H04Q 2209/60* (2013.01)

(58) Field of Classification Search
CPC ......... G01D 4/002; G01D 4/004; G01D 4/00; G01D 4/006; G01D 4/02; G01D 7/00; G01D 21/00
USPC ........... 340/870.02, 870.05; 361/668; 702/62; 324/508, 771

IPC ............... G01D 4/002,4/004, 4/00, 4/006, 4/02, G01D 7/00, 21/00
See application file for complete search history.

(56) References Cited

U.S. PATENT DOCUMENTS

| | | |
|---|---|---|
| 5,572,438 A | 11/1996 | Ehlers et al. |
| 5,923,269 A | 7/1999 | Shuey et al. |
| 6,528,957 B1 | 3/2003 | Luchaco |
| 6,937,003 B2 * | 8/2005 | Bowman et al. .......... 324/117 R |
| 7,548,833 B2 | 6/2009 | Ahmed |
| 7,610,910 B2 | 11/2009 | Ahmed |
| 7,758,368 B2 | 7/2010 | Schelonka et al. |

(Continued)

OTHER PUBLICATIONS

Sames, "Evaluation Board for the SA9904B Energy Metering IC," 22 pages, Mar. 6, 2005.

(Continued)

*Primary Examiner* — George Bugg
*Assistant Examiner* — Munear Akki
(74) *Attorney, Agent, or Firm* — Seager Tufte & Wickhem LLP

(57) ABSTRACT

A meter device having supporting communications. The meter device may monitor a plurality of determinants. The determinants may be stored and displayed at the meter device. The meter device may support various communication protocols, such as dual communication protocols for simultaneous transmission via RS-485 and the Ethernet. The meter device may have a housing with a pair or more of communication ports. The device may have a data bus connector. The device may have a communication bus that can connect directly to a Java application control engine. Also, the device may have a din rail housing.

19 Claims, 7 Drawing Sheets

(56) References Cited

U.S. PATENT DOCUMENTS

| | | | |
|---|---|---|---|
| 8,587,949 B2 * | 11/2013 | Banhegyesi et al. | 361/736 |
| 2008/0074284 A1 * | 3/2008 | Edwards et al. | 340/870.02 |
| 2008/0158008 A1 * | 7/2008 | Kagan et al. | 340/870.05 |
| 2010/0106543 A1 * | 4/2010 | Marti | 705/7 |
| 2010/0164749 A1 * | 7/2010 | Hope et al. | 340/870.02 |
| 2010/0179777 A1 * | 7/2010 | Kagan et al. | 702/62 |
| 2010/0238293 A1 * | 9/2010 | Baronas et al. | 348/160 |
| 2012/0105249 A1 * | 5/2012 | Bauerfeld et al. | 340/870.02 |
| 2014/0025321 A1 * | 1/2014 | Spanier | 702/62 |

OTHER PUBLICATIONS

Sames, "Three Phase Power/Energy IC with SPI Interface," 12 pages, Apr. 7, 2003.

* cited by examiner

DUAL PROTOCOL METER COMBINATION MATRIX

| RS485 Port | Ethernet Port |
|---|---|
| EZ-7 | EZ-7 |
| EZ-7 | Modbus TCP/IP |
| EZ-7 | BACNet IP |
| Modbus RTU | EZ-7 |
| Modbus RTU | Modbus TCP/IP |
| BACNet MS/TP | EZ-7 |
| Lonworks TP | EZ-7 |
| Lonworks TP | Modbus TCP/IP |
| Lonworks TP | BACNet IP |

FIGURE 2

| E-Mon Modbus Point Map | | | | | | | | 1.06 | 04/21 | | s:\my documents\excel\emon-modbus-pointmap-f106.xls | | |
|---|---|---|---|---|---|---|---|---|---|---|---|---|---|
| | INTEGER | W | FLOAT | | UOM | | CALC. | MEM | OP | DESCRIPTION | | CL3000 | CL5000 |
| | | | | | | | | | | | | | V-CLASS |
| 1 | 40001 | 2 | 41001 | | kWh | | T-del | NV | R/W | Energy delivered | | Y | Y |
| 2 | 40003 | 2 | 41003 | | kWh | | T-rec | NV | R/W | Energy received | | Y | Y |
| 3 | 40005 | 2 | 41005 | | kVARh | | T-del | NV | R/W | Reactive energy delivered | | Y | Y |
| 4 | 40007 | 2 | 41007 | | kVARh | | T-rec | NV | R/W | Reactive energy received | | Y | Y |
| 5 | | | 41009 | | kW | | T | | R | Real power | | Y | Y |
| 6 | | | 41011 | | kVAR | | T | | R | Reactive power | | Y | Y |
| 7 | | | 41013 | | kVA | | T | | R | Apparent power | | Y | Y |
| 8 | | | 41015 | | % | | T | | R | Power factor | | Y | Y |
| 9 | | | 41017 | | Amps | | T | | R | Current total | | Y | Y |
| 10 | | | 41019 | | Amps | | A | | R | Current average | | Y | Y |
| 11 | | | 41021 | | Volts-N | | A | | R | Voltage line-neutral | | Y | Y |
| 12 | | | 41023 | | Volts-L | | A | | R | Voltage line-line | | Y | Y |
| 13 | | | 41025 | | Hz | | A | | R | Frequency | | Y | Y |
| 14 | | | 41027 | | Degree | | A | | R | Phase angle | | Y | Y |
| 15 | | | 41029 | | kW | | ØA | | R | Real power, phase A | | Y | Y |
| 16 | | | 41031 | | kW | | ØB | | R | Real power, phase B | | Y | Y |
| 17 | | | 41033 | | kW | | ØC | | R | Real power, phase C | | Y | Y |
| 18 | | | 41035 | | kVAR | | ØA | | R | Reactive power, phase A | | Y | Y |
| 19 | | | 41037 | | kVAR | | ØB | | R | Reactive power, phase B | | Y | Y |
| 20 | | | 41039 | | kVAR | | ØC | | R | Reactive power, phase C | | Y | Y |
| 21 | | | 41041 | | kVA | | ØA | | R | Apparent power, phase A | | Y | Y |
| 22 | | | 41043 | | kVA | | ØB | | R | Apparent power, phase B | | Y | Y |
| 23 | | | 41045 | | kVA | | ØC | | R | Apparent power, phase C | | Y | Y |
| 24 | | | 41047 | | % PF | | ØA | | R | Power factor, phase A | | Y | Y |
| 25 | | | 41049 | | % PF | | ØB | | R | Power factor, phase B | | Y | Y |
| 26 | | | 41051 | | % PF | | ØC | | R | Power factor, phase C | | Y | Y |
| 27 | | | 41053 | | Amps | | ØA | | R | Current, phase A | | Y | Y |
| 28 | | | 41055 | | Amps | | ØB | | R | Current, phase B | | Y | Y |
| 29 | | | 41057 | | Amps | | ØC | | R | Current, phase C | | Y | Y |
| 30 | | | 41059 | | Volts-N | | ØA | | R | Voltage, line to neutral, phase A-N | | Y | Y |
| 31 | | | 41061 | | Volts-N | | ØB | | R | Voltage, line to neutral, phase B-N | | Y | Y |
| 32 | | | 41063 | | Volts-N | | ØC | | R | Voltage, line to neutral, phase C-N | | Y | Y |
| 33 | | | 41065 | | Volts-L | | ØA | | R | Voltage, line to line, phase A-B | | Y | Y |
| 34 | | | 41067 | | Volts-L | | ØB | | R | Voltage, line to line, phase B-C | | Y | Y |
| 35 | | | 41069 | | Volts-L | | ØC | | R | Voltage, line to line, phase C-A | | Y | Y |
| 36 | | | 41071 | | Degree | | ØA | | R | Phase angle, phase A | | Y | Y |
| 37 | | | 41073 | | Degree | | ØB | | R | Phase angle, phase B | | Y | Y |
| 38 | | | 41075 | | Degree | | ØC | | R | Phase angle, phase C | | Y | Y |
| 39 | | | 41077 | | | | | | | | | | |
| 40 | | | 41079 | | | | | | | | | | |
| 41 | | | 41081 | | | | | | | | | | |
| 42 | | | 41083 | | Pulse | | | | | Auxilary Input 1 | | Y | Y |
| 43 | | | 41085 | | Pulse | | | | | Auxilary Input 2 | | Y | Y |

FIGURE 4a

| ITEM | PM-I | W | DATA (SAMPLE) | DESCRIPTION | |
|---|---|---|---|---|---|
| | 46001 | 8 | 504D 324B 0106 0421 0800 454D 4F4E 2020 | Firmware version: PM 5K, Ver, Ver date/time, EMON | R |
| | 46009 | 8 | 456E 6572 6779 204D 6574 6572 0000 0000 | Device description: Emon Energy Meter | R |
| | 46017 | 8 | 1356 4503 0613 0300 0000 0000 0000 0000 | Initialize device with date/time | W |
| | 46025 | 8 | 1356 4503 0613 0300 0000 0000 0000 0000 | RTC date/time, will accept broadcast command | R/W |
| | 46033 | 8 | 1356 4503 0527 0300 0000 0000 0000 0000 | CPU date/time (7 bytes, rest is reserved for other future formats) | R/W |
| | 46041 | 8 | 0001 0001 0000 0000 0000 0311 0020 1100 | Group, location, Device ID number | R/W |
| | 46049 | 8 | 0041 0000 0000 0000 0000 0311 0020 1100 | Dev. ID, Hookup, Serial numbers..... | R/W |
| | 46057 | 8 | 0592 0007 0000 0000 0000 0000 0000 0000 | Recorder info.: idr, dem. int., dem. win., dem. syn., timezone, DST | R/W |
| | 46065 | 8 | 0101 0001 0D03 3531 1000 0320 0000 0000 | Meter info.: SN1&2, pulse rate, Volt/Amp/CTs, PF/mult1&2, CT, PT | R/W |
| | | | | | |
| | 46513 | 8 | 0000 0101 0000 0000 0000 0100 0000 0000 | Flags L1 | |
| | 46521 | 8 | 0000 0000 0000 0000 0000 0613 0316 0000 | Flags L2 | |
| | 46529 | 8 | 0000 0000 0000 0000 0000 0000 0000 0000 | Flags L3 | |
| | 46537 | 8 | 0000 0000 0000 0000 0000 0000 0000 0000 | Flags L4 | |

Note: To change device ID, set single point at 46049 with data set to new device ID (e.g. 1 to 247)
To set date/time, set multiple points at 46025 for 4 points with data set to HHMM SSDW MMDD YYYY (DW=day of week)
To clear single meter kWh/kW, set single point at 41001 with data set to 0000 (similarly for 41003, 41005, 41007)
Note: Jumper J5 & J6 must be closed in order for kWh del/rec and kVARh del/rec to be cleared FIGURE 4b

METER DEVICE WITH SUPPORTING COMMUNICATIONS

This application claims the benefit of U.S. Provisional Patent Application 61/297,993, filed Jan. 25, 2010. U.S. Provisional Patent Application 61/297,993, filed Jan. 25, 2010, is hereby incorporated by reference.

BACKGROUND

The present disclosure pertains to meter devices and particularly to meter devices having supporting communications. More particularly, the disclosure pertains to metering devices which may be used in energy-related systems.

SUMMARY

The present disclosure reveals a meter device having supporting communications. The meter device may monitor a plurality of determinants. The determinants may be stored and displayed at the meter device. The meter device may support various communication protocols, such as dual communication protocols for simultaneous transmission via RS-485 and the Ethernet. The meter device may have a housing with a one or more of communication ports. The device may have a data bus connector and a communication bus that can connect directly to a Java application control engine. Also, the device may have a din rail housing.

BRIEF DESCRIPTION OF THE DRAWING

FIG. 2 is a diagram showing an example dual protocol meter combination matrix;

FIGS. 4a and 4b are diagrams of an example point map;

DESCRIPTION

The present device may be applicable to energy management and a building automation system (BAS) having a local area network or home automation data bus such as a CEBus (i.e., consumer electronics bus). The device may be applicable to various demand response energy related systems. The device may be a sub-meter.

Each load of a system may be connected to a bus via a control module which may contain a circuit breaker to disconnect the load from the mains upon command or upon occurrence of a power outage. The present device may be a meter supporting at least one communication protocol for metering determinants and providing communication of the data.

Figure 1:
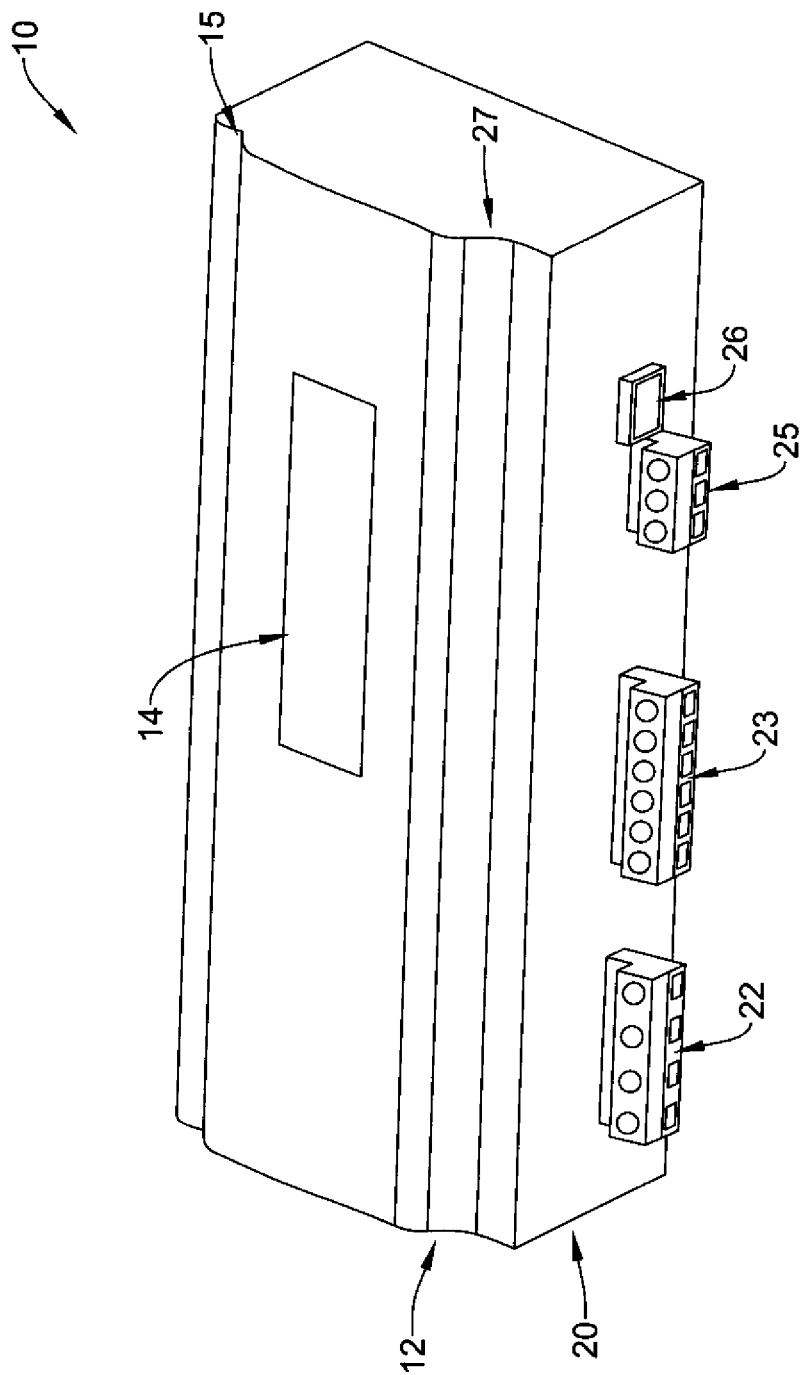
FIG. 1 is a diagram of the meter device supporting communications.

FIG. 1 is a diagram of an illustrative example of a meter device 10 having supporting communications. An instance may be a 3-phase kWh meter with serial communications. It could be of another number of phases and/or have non-serial communications. The meter may be used on configurations, for example, such as 3-phase, 4-wire and 2-phase, 3-wire types. The meter may be used on other configurations. The meter device 10 may be for 120/208-240 volts and have current ranges from less than 100 amperes to more than 3200 amperes.

A meter module 12 may monitor various determinants. Meter module 12 may monitor up to a predetermined number of determinants. For instance, 38 determinants may be monitored in one version of module 12. FIGS. 4a and 4b show an example Modbus point map 45 and 46 for such determinants. Example determinants, which may be shown on display 14, can incorporate kWh, kW, power factor per phase, amps per phase, volts per phase, real time load in kW, kW demand (with peak date and time), meter date/time, and so forth. There may also be an on-board set-up for an IP address. Display 14 may be provided on a housing 15 to show information directed to the various determinants. Display 14 may have a 4-line, 20 character screen. The display may instead have other styles of screens. The screen may have LCD, LED, plasma or other kinds of display elements.

Line voltage terminal 22 and current sensor terminal 23 may provide input to meter module 12. Current sensor terminal 23 may be used for receiving data or information from current sensors positioned at a remote distance from meter module 12. Connections from the current sensors may be by wire, internet and/or be wireless. For example, 0-2 volt output split-core sensors may be used at sensing locations up to 2000 feet from device 10 without power interruption. Solid-core sensors may be available for meters to measure various magnitudes of current. There may be a current sensor installation diagnostic indicator. Meter device 10 may, as needed, provide revenue grade metering accuracy. The device may be certifiable to ANSI C12.1 and C12.16 electronic meter national accuracy standards (e.g., +/−1% from 1%-100% of the rated load).

Figure 3:
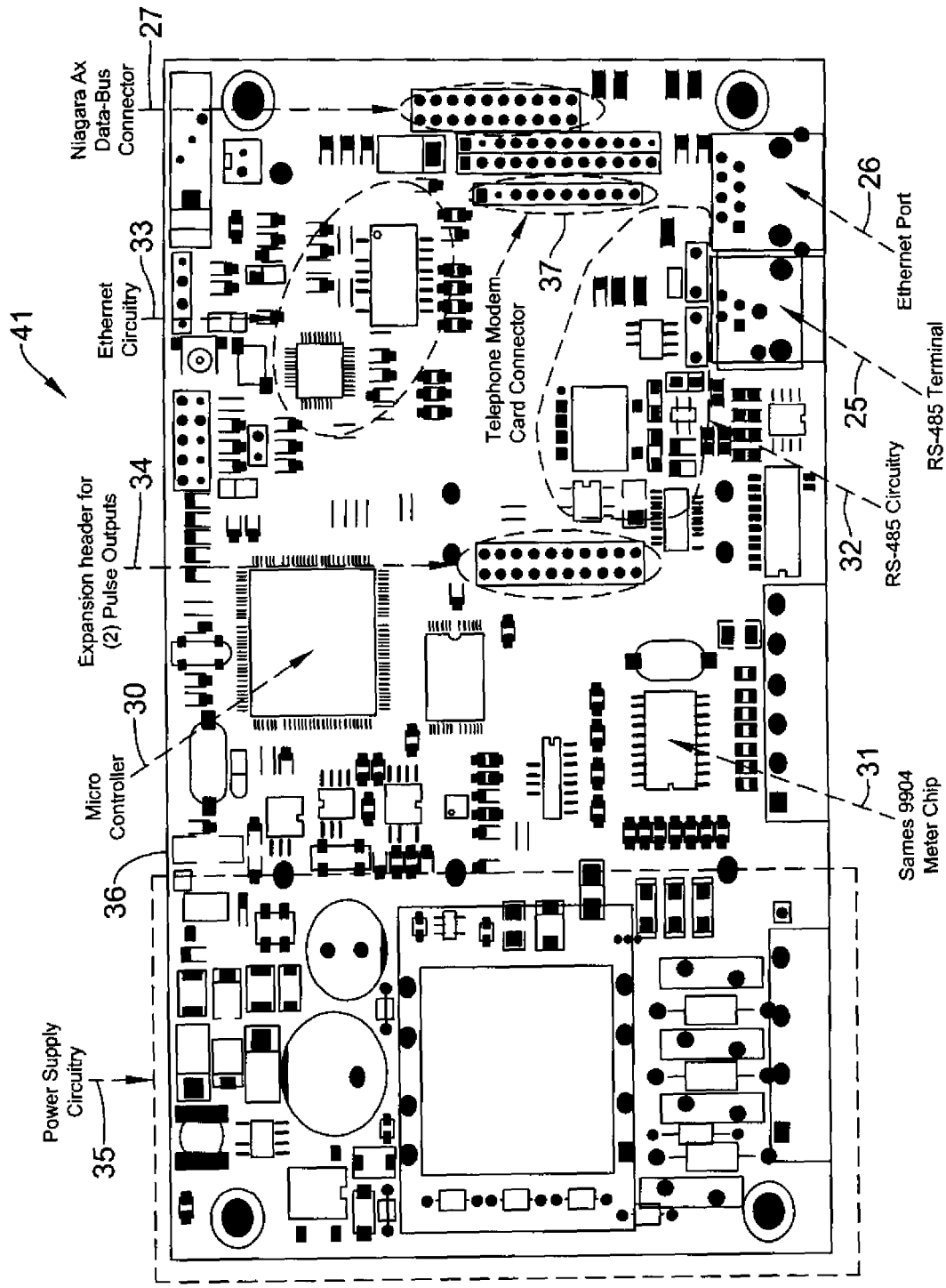
FIG. 3 is a diagram of an example board layout for the meter device.
Figure 5:
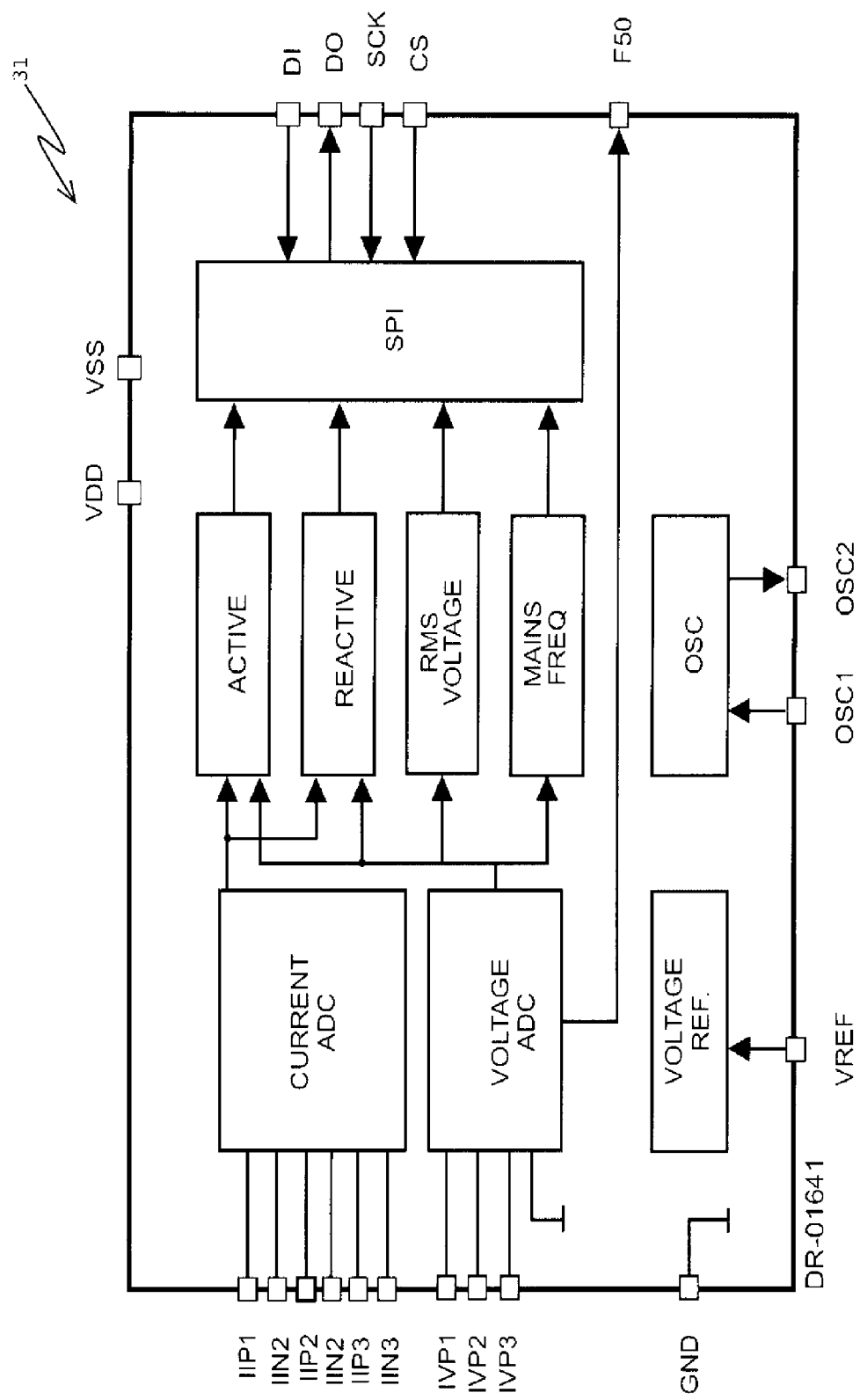
FIG. 5 is a diagram of an example meter chip.

Meter module 12 may determine and store information directed to the determinants in data registers using a microcontroller 30 and a meter chip 31 situated on a circuit board 41 of device 10, as shown in FIG. 3. Meter chip 31 may for example be a Sames™ 9904 of which a block diagram is shown in FIG. 5. A chip from another manufacturer may instead be incorporated as a meter chip 31. Non-volatile memory may be present on the board. Also shown on board 41 are an RS-485 terminal 25 along with RS-485 circuitry 32 and an Ethernet port 26 along with Ethernet circuitry 33. There may also or instead be an RS-232 terminal and circuitry. There may be a Niagara AX data bus connector 27 and a telephone modem card connector 37 on the board. An expansion header 34 for one or more pulse outputs may be on component board 36. There may be a terminal block for a fixed-value pulse output. There may be a pulse input card for one or more meters, of a group consisting of electric, gas, water, BTU and gas meters, and so forth. The meters may be remote relative to the device 10. Power supply circuitry 35 may also be on the board. Board 41 may have lateral dimensions of about 3⅞ inches by 6 inches, although the board may have other dimensions.

In FIG. 1, a communication module 20 may be incorporated in device 10 for supporting communications between device 10 and other systems or devices. Communication module 20 may have, for example, a dual communication protocol for simultaneous transmission of data, such as over RS-232/RS-485 and Ethernet. Device 10 may have various communication options built-in. The options may be for use with an E-Mon™ energy mechanism. The communication options or those already built into the device 10 may incorporate a telephone modem, Modbus RTU, Modbus TCP/IP, BACNet MS/TP, BACNet IP and Lonworks TP (twisted pair) circuitry, and so forth.

Communication module 20 may support a plurality of communication protocols such as an EZ-7 protocol relative to E-Mon, Modbus, BACnet, LonWorks and telephone modem protocols. Suitable registers may incorporate Modbus data registers. Communication module 20 may have two ports, for example, such as the RS-485 port 25 and the Ethernet port 26 to provide dual protocol configurations which can be used in, for instance, building automation systems. Example configurations of ports 25 and 26 are shown in a table 42 of FIG. 2. Meter device 10 may support dual or more communication transmissions and/or receptions of data via RS-232/RS-485 and the Ethernet. These transmissions may be synchronous. The table may be a dual protocol meter combination matrix. The matrix may show combinations of protocols between ports 25 and 26, respectively, which may include EZ-7 and EZ-7, EZ-7 and Modbus TCP/IP, EZ-7 and BACNet IP, Modbus RTU and EZ-7, Modbus RTU and Modbus TCP/IP, BACNet MS/TP and EZ-7, Lonworks TP and EZ-7, Lonworks TP and Modbus TCP/IP, and Lonworks TP and BACNet IP. One or more communication ports of device 10 may be for various internet, wire and/or wireless connections.

RS-485 circuitry 32 may receive and send information via RS-485 port 25, as shown in FIG. 3. Ethernet circuitry 33 may receive and send information via an Ethernet port 26. Expansion header 34 may be used for two or so pulse outputs. For instance, two pulse outputs may be used for two meter measurements of, for example, electric, gas, fuel oil, water, BTUs, and the like. Power supply circuitry 35 may be incorporated for powering circuit board 36. The telephone modem card connector 37 may be included on circuit board 36.

Relative to FIG. 1, device 10 may include a data bus connector 27 for interfacing to remote systems for control and access to remote systems such as over the Internet. For example, data bus connector 27 may be a Niagara Ax data-bus connector for interfacing to a Java application control engine (JACE), such as a JACE 200 available through Tridium, Inc. For example, the connection or interface may be virtually direct to the engine.

The example point map, having portions 45 and 46 for 38 or so Modbus data registers and for data examples, respectively, is shown in FIGS. 4*a* and 4*b*. Portion 45 shows a list for 38 electric power related parameters. The point map could also be for other kinds of energy related parameters. Some examples of the parameters of point map 45 may be energy delivered, energy received, reactive energy delivered, reactive energy received, real power, reactive power, apparent power, power factor, current total, current average, voltage line-neutral, voltage line-line, frequency, phase angle, real power-phase A, real power phase B, real power-phase C, reactive power-phase A, reactive power-phase B, reactive power-phase C, apparent power-phase A, apparent power-phase B, apparent power-phase C, power factor-phase A, power factor-phase B, power factor-phase C, current-phase A, current-phase B, current-phase C, voltage, voltage-line to neutral-phase A-N, voltage-line to neutral-phase B-N, voltage-line to neutral-phase C-N, voltage-line to line-phase A-B, voltage-line to line-phase B-C, voltage-line to line-phase C-A, phase angle-phase A, phase angle-phase B, and/or phase angle-phase C. There may be additional parameters. Also, portion 45 of the map may have one or more auxiliary inputs of the pulse type.

Portion 46 in FIG. 4*b* of the point map shows a partial listing of data samples and corresponding descriptions of items relative to device 10.

Housing 15 in FIG. 1 of device 10 may be formed, for example, of a non-metallic material. Example dimensions for a housing 15 may be 7"W×5.5"H×2.5"D. Housing 15 may have a din rail hookup mechanism or screw mount chassis for mounting it to a din rail or other holding mechanism, which in turn may be attached to some supporting wall or other structure.

One or more examples of a din (or DIN) rail mounting may be described in U.S. patent application Ser. No. 11/754,770, filed May 29, 2007, issued as U.S. Pat. No. 7,758,368 on Jul. 20, 2010, and entitled "DIN Rail Mount". U.S. patent application Ser. No. 11/754,770, filed May 29, 2007, issued as U.S. Pat. No. 7,758,368 on Jul. 20, 2010, and entitled "DIN Rail Mount", is hereby incorporated by reference.

Figure 6:
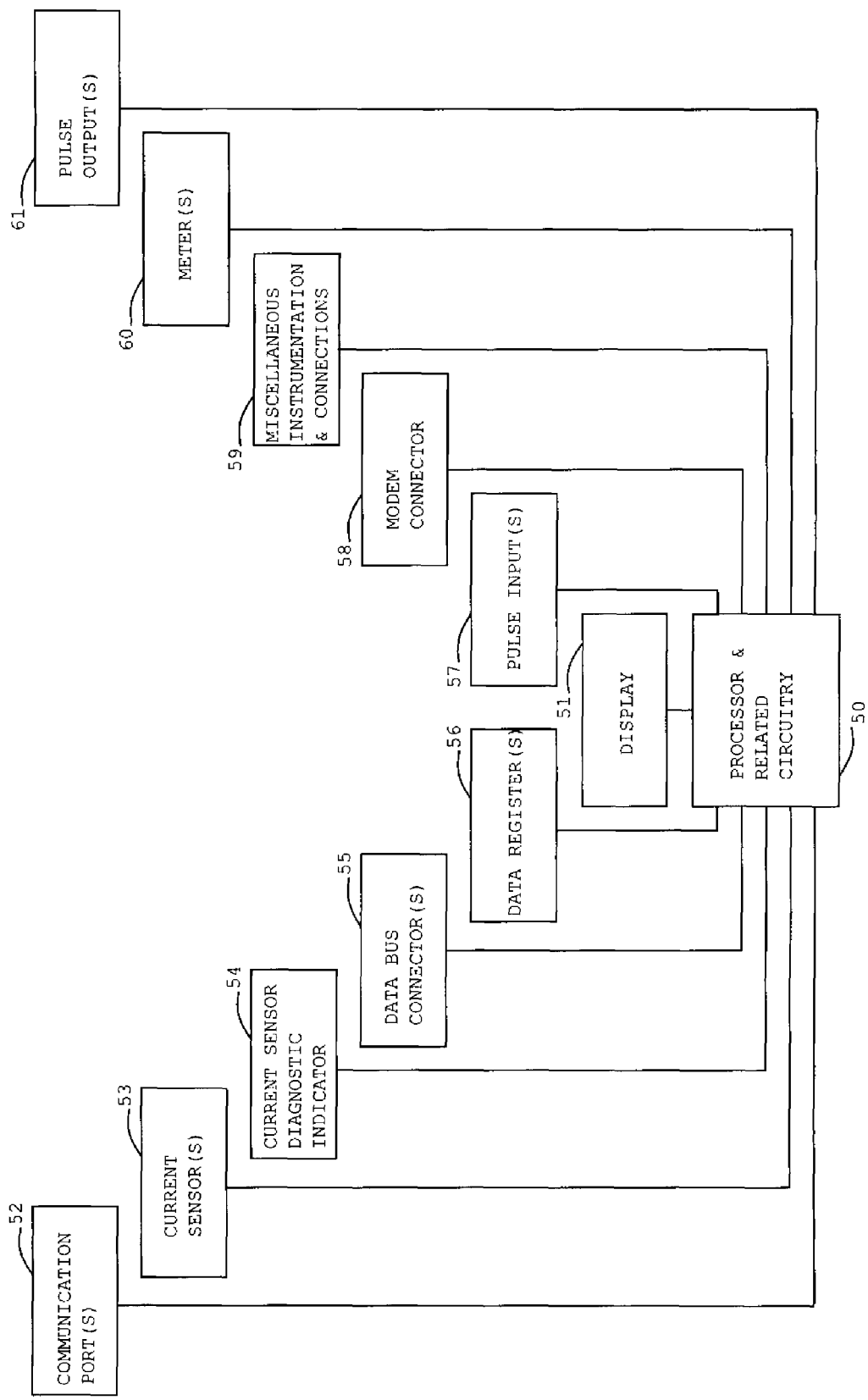
FIG. 6 is a diagram of a meter device and components.

FIG. 6 is a diagram of the meter device along with many components. The terminology in symbols 50-61 may indicate illustrative example components described herein and/or other similar components. One or more communication ports 52, one or more current sensors 53, a current sensor diagnostic indicator 54, one or more data bus connectors 55, one or more data registers 56, one or more pulse inputs 57, a modem connector 58, miscellaneous instrumentation and connections 59, one or more meters 60, and/or one or more pulse outputs 61 may be connected to a processor and related circuitry 50. A display 51 may be connected to the processor and related circuitry 50. Other components may be connected to the processor and related circuitry 50 and/or display 51. One or more of the components shown and/or not shown in one or more of the Figures in the present disclosure may be incorporated with the device in FIG. 6.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A meter device having communications, comprising:
a processor;
a display connected to the processor;
a plurality of data registers connected to the processor;
one or more remote current sensors connected to the processor;
a data bus connector, connected to the processor, for interfacing with a Java control application engine JACE;
a communication module, wherein the communication module supports one or more protocols selected from a plurality of communication protocols comprising EZ-7, E-Mon, Modbus, BACnet, and LonWorks protocols dual communication protocol ports, connected to the processor, for simultaneous transmission via RS-232/RS-485 and an Ethernet;
an enclosure for containing the processor and display; and
wherein the enclosure incorporates a din rail mounting.

2. The device of claim 1, further comprising an input for one or more meters that measure amounts of usage of electricity, gas, fuel oil, water, and/or BTUs.

3. The device of claim 1, wherein the display provides readings from measurements of kilowatt hours, power factor per phase, amperes per phase, kilowatt demand, real-time load in kilowatts, and/or volts per phase.

4. The device of claim 1, further comprising a telephone modem connected to the processor.

5. A meter for measuring electrical parameters, comprising:
a processor;
a display connected to the processor;

one or more registers connected to the processor;
one or more current sensors connected to the processor;
a communication module, wherein the communication module supports one or more protocols selected from a plurality of communication protocols comprising EZ-7, E-Mon, Modbus, BACnet, and LonWorks protocols;
dual communication protocol ports connected to the processor for simultaneous transmission of data in two or more protocols; and
a data bus connected to the processor for an interface with an Java application control engine JACE.

6. The meter of claim 5, further comprising:
an enclosure for at least the processor and the display; and
the enclosure comprises a din rail mounting mechanism.

7. The meter of claim 6, wherein the enclosure comprises a non-metallic chassis.

8. The meter of claim 5, further comprising:
a block for a pulse output; and
a pulse input terminal for one or more external meters.

9. The meter of claim 8, wherein the one or more meters are for measuring amounts of electricity, gas, water, fuel oil, and/or BTUs.

10. The meter of claim 5, wherein the one or more communication ports are for various internet, wire and/or wireless connections.

11. The meter of claim 5, wherein the data bus is a Niagara$^{Ax}$ data bus for interfacing with a Java application control engine.

12. The meter of claim 5, wherein the two or more protocols are handled by an RS-232/RS-485 port and an Ethernet port.

13. The meter of claim 5, wherein the display provides readings of kilowatt hours, power factor per phase, amperes per phase, kilowatt demand, real time load in kilowatts, volts per phase, IP address, and/or meter date and time.

14. The meter of claim 5, wherein the meter may be used with a three-phase, four-wire electric power configuration and/or a two phase, three-wire electric power configuration.

15. A meter for measuring utility usages, comprising:
a processor;
one or more sensors, for detecting utility usages, connected to the processor;
a communication module, wherein the communication module supports one or more protocols selected from a plurality of communication protocols comprising EZ-7, E-Mon, Modbus, BACnet, and LonWorks protocols;
dual communication ports for transmitting and/or receiving simultaneous communications in two or more protocols;
a data bus connector for a Java application control engine JACE;
an input, for one or more meters, connected to the processor; and
a display connected to the processor.

16. The meter of claim 15, further comprising wherein the one or more meters are for measuring usage of one or more items from a group consisting of electricity, gas, water, BTUs, and fuel oil.

17. The meter of claim 15, wherein at least one of the one or more sensors is a remote device having a wireless connection to the processor.

18. The meter of claim 15, further comprising:
a sensor diagnostic indicator; and
wherein at least one of the one or more sensors measures electrical parameters.

19. The meter of claim 18, further comprising one or more data registers for one or more electrical parameters selected from a group consisting of energy delivered, energy received, reactive energy delivered, reactive energy received, real power, reactive power, apparent power, power factor, current total, current average, voltage line-neutral, voltage line-line, frequency, phase angle, real power-phase A, real power phase B, real power-phase C, reactive power-phase A, reactive power-phase B, reactive power-phase C, apparent power-phase A, apparent power-phase B, apparent power-phase C, power factor-phase A, power factor-phase B, power factor-phase C, current-phase A, current-phase B, current-phase C, voltage, voltage-line to neutral-phase A-N, voltage-line to neutral-phase B-N, voltage-line to neutral-phase C-N, voltage-line to line-phase A-B, voltage-line to line-phase B-C, voltage-line to line-phase C-A, phase angle-phase A, phase angle-phase B, and/or phase angle-phase C.

* * * * *